2,965,580

TREATING PROCESSES FOR IMPROVING PHYSICAL PROPERTIES OF PHOSPHORS

Jacob Quentin Umberger, Holmdel, N.J., assignor to E. I. du Pont de Nemours and Company, Wilmington, Del., a corporation of Delaware No Drawing. Filed July 18, 1957, Ser. No. 672,567

13 Claims. (Cl. 252—301.6)

This invention relates to a process for improving the physical properties of phosphors of the zinc sulfide type. More particularly, it relates to a process for treating metal activated phosphors which are zinc, cadmium and zinc cadmium salts of a chalcogen having an atomic number greater than eight, by utilizing a treating solution containing an acid and a water soluble reactive compound.

Certain types of phosphors are known to have a surface discoloration which is highly objectionable during later use. This is particularly true of the phosphors of the zinc sulfide type, which includes zinc, cadmium and zinc cadmium salts of a chalcogen having an atomic number greater than eight, including sulfides, selenides, tellurides, sulfoselenides and sulfotellurides. When these phosphors are "activated" to luminescence with one or more activating metals, such as silver, copper, gold, lead, and to some extent manganese, a dark objectionable surface discoloration is formed during the preparation of the phosphor, typically during calcination or upon exposure to moisture subsequent to calcination. This undesirable discoloration is due to a thin, usually irregular coating of a metal chalcogenide or chalcogenides formed by the activating metal and the base material chalcogen of the phosphor. The problem exists especially when a relatively large amount of activating metal has been used to produce the phosphor. Such a surface coating is known to be objectionable because it seriously hampers the emission efficiency and reflectance characteristics of the phosphor, as well as for other reasons known in the art.

One known method of removing such an undesired dark surface coating of the relatively insoluble activating metal-chalcogenide is to wash the luminescent phosphor particles with a solution of potassium or sodium cyanide. Such a washing treatment, although effective, has the obvious disadvantage of utilizing the highly toxic cyanide, which is also relatively expensive. Other prior art treatments which have been attempted have proven more or less unsatisfactory for similar reasons, including toxicity, relative expense of treating materials, length of time required to treat the phosphors, ineffectiveness and irreproducibility of results, etc.

An object of this invention, therefore, is to provide an improved process for removing surface discoloration from metal activated zinc, cadmium and zinc cadmium chalcogenide phosphors. Another object is to improve the physical properties, such as appearance, reflectance and emission brightness of such phosphors. A further object is to provide a novel treatment for phosphors wherein the treating composition is relatively non-toxic, and is inexpensive, effective in operation and reproducible in results. Still another object is to provide such a process wherein no hazardous or complicated waste disposal problem is created. Yet another object is to provide an improved process for treating phosphors which process aids to break up particle aggregates which interfere with the preparation of luminescent screens or similar layers of smooth and continuous texture. Still other objects will be apparent from the following description of the invention.

In a broad aspect, the process of this invention comprises removing dark-colored activating metal chalcogenide compounds from the surface of luminescent phosphors by treating the phosphors with an aqueous solution containing an acid having a $pK_a$ of less than 5 in an amount sufficient to maintain the pH of the aqueous solution between $-1$ and 4.5, and a water soluble reactive compound from the group consisting of (1) thiourea and (2) a salt, the cation of which is selected from the group consisting of (a) alkali metals, (b) alkaline earth metals, and (c) ammonium, and the anion of which is selected from the group consisting of (a) iodide, (b) thiosulfate, and (c) thiocyanate.

It is important according to this invention that the acid utilized in the treating solution have a $pK_a$ (the negative logarithm of the acid dissociation constant, conventionally identified as K) of less than 5. Preferred acids include acetic acid, sulfuric acid, hydrochloric acid, sodium bisulfate, and phosphoric acid, but other acids having a $pK_a$ of less than 5 may be used, such as nitric acid, sulfurous acid, adipic acid, glycollic acid, diglycollic acid, citric acid, etc. Particularly preferred are acetic acid and sulfuric acid.

The concentration of the treating solution may vary over a broad range and optimum concentration will be readily determinable by persons in the art according to the teachings set forth herein. The concentration will depend on the ingredients of the treating solution, treating time, temperature, amount of discoloration it is desired to remove, etc. Generally, a concentration of 5% and higher of the water soluble reactive compound referred to above is preferred, based on the weight of the treating solution, and any amount up to saturation of the solution may be conveniently used. A preferred range of concentration is from 5% to 50%.

Maintenance of the pH of the treating solution within the range of $-1$ to 4.5 during the entire treating process has been found to be important. Outside of this range, the treatment has been found to be unsatisfactory. The range of pH from 1 to 4 has been found to be particularly advantageous, and a pH from 3 to 4 is preferred.

The process of this invention may be carried out in any manner which effects contact between the aqueous treating solution and the luminescent phosphor being treated for a sufficient time to remove the undesired activating metal-chalcogenide surface discoloration. Thus, the phosphor being treated may be washed with the treating solution by passing the solution continuously over the phosphor. For example, the phosphor may rest on a suitable small mesh screen or filter material over which the treating solution is poured.

In a preferred method for treating the phosphor particles, the phosphor to be treated is slurried (admixed) with an aqueous solution of the thiourea or salt. The acid is then added in an amount to bring the pH of the solution within the prescribed range after which the slurry is stirred, the treating solution filtered off, the phosphor washed with pure water and dried. The phosphor treated in this manner lacks the dingy surface discoloration of the untreated phosphor.

The treating time required for the process of this invention is not particularly critical, and will depend on the concentration of the treating solution, ingredients used, the total amount or turnover of the treating solution coming into contact with the phosphor, the temperature, etc. A convenient suitable time has been found to be within the range of ½ to 3 hours, and is preferably about one hour.

The process of this invention is preferably carried out with the treating solution at room temperature, although higher or lower temperatures can be used. A convenient, but not limitative, operating range, lies between 15° C. and 95° C. A preferred temperature is between 20° C. and 35° C.

Of the thiourea-containing and the salt-containing treating solutions, the latter are preferred. In particular are preferred the latter wherein the cation of the salt is an alkali metal and the anion is thiosulfate. Sodium thiosulfate is particularly preferred.

When thiosulfate solutions are used, a small amount of a conventional preservative may be added to the solution to prevent the precipitation of sulfur, that is to say, to minimize sulfurization. Such preservatives include alkali metal sulfites and metal bisulfites and are well known in the art. Up to 10% or more of one or more of such preservatives by weight may conveniently be used as desired.

In one embodiment of this invention, the treating process has been found to be especially advantageous when carried out in the presence of, i.e., when the treating solution contains, an oxidizing agent such as sulfurous acid, potassium ferricyanide, etc. The sulfurous acid can be conveniently introduced into the treating solution as a sulfite, bisulfite, metabisulfite, sulfurous acid, or $SO_2$ gas bubbled through the solution. The inclusion of the oxidizing agent in the bath at the pH of —1 to 4.5 effects the removal from the phosphor surface of elementary metal particles, the presence of which also may reduce the phosphor efficiency. The oxidizing agent has been found to be effective in concentrations of up to 15% by weight.

It will be understood from the above that when the essential acid ingredient as taught above is sulfurous acid, the sulfurous acid can function in a dual capacity (acid and oxidizing agent) and it is desirable therefore to include in the treating solution an excess of the acid. It will also be understood that the preservative, the presence of which is advantageous when the salt is a thiosulfate, may also function in a dual capacity (preservative and oxidizing agent) and an excess of such ingredient can also be used. However, when for example the water soluble compound is thiourea and no preservative is required, the oxidizing agent serves its single function to remove elementary metal. It is believed that the treatment of phosphors with such an oxidizing agent in a solution maintained within the pH as taught above is novel and particularly effective.

While not wishing to be limited by the following theory, it is believed that the reason for the excellent performance of the aqueous treating solutions of the acid and the thiourea or salt in the process of the invention lies in the fact that, as the thiourea or salt effectively removes the undesired activating metal cations from the phosphor surface by forming a soluble product, the acid simultaneously protonates the chalcogenide anions to form a hydrogen chalcogenide, which evolves as a gas and thus is removed. In this way, the surprising result is obtained that materials such as silver and copper sulfides, usually reputed to be soluble only in drastic and hazardous reagents such as potassium cyanide or hot concentrated nitric acid, are readily and efficiently taken into solution and removed.

The invention will be further illustrated but is not intended to be limited by the following examples carried out with the treating solution at room temperature unless otherwise indicated, wherein parts indicated are parts by weight:

*Example I*

A luminescent silver activated zinc sulfide phosphor, which had been prepared by calcining zinc sulfide with a silver compound containing 0.028% silver based on the zinc sulfide, was observed to have a dingy brownish-gray color and relatively inefficient luminescent properties due to a thin surface coating of silver sulfide. The phosphor was slurried with a treating solution of water containing 46% sodium thiosulfate and 2% sodium metabisulfite. Glacial acetic acid was added slowly, with stirring, until a pH of 3.5 to 4 was obtained in the slurry. Stirring was continued for 1 hour, the acid thiosulfate solution filtered off, and the phosphor washed with pure water and dried. The surface of the phosphor was observed to be white. The dingy brownish-gray surface discoloration had been removed, leaving the white body color of the phosphor exposed. Comparison of the treated phosphor with an untreated control sample showed that the reflectance at 450 millimicrons had increased from 68.0% to 95.8% by the treatment according to this invention. The treated phosphor exhibited an improvement in emission brightness of greater than 50%.

*Example II*

Example I was repeated except that the treating solution was water containing 60% ammonium thiosulfate and 2% sodium metabisulfite, the pH of which solution was adjusted as in that example. The surface color of the treated phosphor had improved as in that example. Comparison of the treated phosphor with an untreated control sample showed that the reflectance at 450 millimicrons had increased from 68.0% to 94.4%. The treated phosphor exhibited an improvement in emission brightness as in that example.

*Example III*

Example I was repeated using a silver activated zinc sulfide luminescent phosphor heated in the presence of alkaline earth halides. The treating solution was water containing 20% sodium thiosulfate and 2% sodium metabisulfite. The pH of the treating solution was adjusted as in that example to about 4. The surface color and emission brightness were improved as in that example, and the reflectance at 450 millimicrons had increased from 69.7% to 92.0%.

*Example IV*

Example III was repeated except that 10% anhydrous sodium thiosulfate was used, and 2% sodium bisulfite was substituted for metabisulfite. The pH of the treating solution was adjusted as in that example. The surface color and emission brightness were improved as in that example, and the reflectance at 450 millimicrons had increased from 69.7% to 93.8%.

*Example V*

Example III was repeated except that the treating solution was a saturated (about 10%) aqueous solution of thiourea. The pH of the treating solution was adjusted as in that example. The results were similar to those obtained in that example.

*Example VI*

Example III was repeated except that the treating solution was a 40% aqueous solution of potassium iodide. The pH of the treating solution was adjusted as in that example. The results were similar to those obtained in that example.

*Example VII*

Example III was repeated except that the treating solution was a 40% aqueous solution of sodium thiocyanate. The pH of the treating solution was adjusted as in that example. The results were similar to those obtained in that example.

*Example VIII*

Example I was repeated except that the treating solution was a saturated (about 60%) solution of ammonium thiocyanate, the pH of which solution had been adjusted to about 1 to 2 by the addition with stirring of 6 molar hydrochloric acid. The results were similar to those obtained in that example.

Example IX

An electroluminescent copper activated zinc sulfide phosphor, which had been prepared by calcining zinc sulfide with one mole percent of copper, was observed to have a dark brown surface discoloration caused by a thin coating of copper sulfide on the phosphor particles. The phosphor was slurried with a 10% solution of thiourea in water, the pH of which solution had been adjusted to about 2 by the addition of hydrochloric acid. An immediate and striking lightening of the color occurred. The slurry was filtered, the phosphor washed with distilled water and dried. The dark brown surface discoloration had been removed and the emission brightness of the treated phosphor had improved markedly over that of the untreated phosphor.

Example X

Example IX was repeated except that the treating solution was a hot 30% (90° C.) aqueous solution of sodium thiosulfate and 2% sodium metabisulfite, the pH of which solution had been adjusted to about 3.5 by the addition of acetic acid. The results were similar to those obtained in that example.

Example XI

Example IX was repeated except that the treating solution was a saturated (about 60%) aqueous solution of potassium iodide, the pH of which had been adjusted to about 1 to 2 by the addition of 0.1 molar hydrochloric acid. The results were similar to those obtained in that example.

Example XII

Example IX was repeated except that the treating solution was a saturated (about 55%) aqueous solution of ammonium thiocyanate, the pH of which had been adjusted to about 1 to 2 by the addition of 0.1 molar hydrochloric acid. The results were similar to those obtained in that example.

Example XIII

A luminescent silver activated zinc cadmium sulfide phosphor containing 55 mol percent zinc sulfide and 45 mol percent cadmium sulfide was observed to have a dark surface discoloration due to a silver sulfide on the surface of the particles. The phosphor was treated as in the preceding examples with an aqueous treating solution containing 20% sodium thiosulfate and 2% sodium bisulfite, the pH of which solution had been adjusted to about 3.5 by the addition of acetic acid. It was observed that the dark surface discoloration was quickly removed by the treatment with the treating solution, and the phosphor became light cream yellow in color, the natural body color of the phosphor without discoloration.

Example XIV

Example XIII was repeated except that the treating solution was a saturated (about 10%) aqueous solution of thiourea, the pH of which solution had been adjusted to about 1 to 2 by the addition of hydrochloric acid. The results were similar to those obtained in that example.

Example XV

Example XIV was repeated except that the phosphor was a luminescent zinc cadmium selenide phosphor containing 98 mol percent zinc selenide and 2 mol percent cadmium selenide having a dark surface discoloration due to a coating of silver selenide. By treatment with the treating solution of that example, the dark surface color of the phosphor was removed, revealing a bright yellow orange, which is the body color of the luminescent zinc cadmium selenide phosphor without surface discoloration. The reflectance and emission brightness of the phosphor were also markedly improved by this treatment.

Example XVI

Example XV was repeated except that the treating solution was a 30% aqueous solution of sodium thiosulfate and 2% sodium metabisulfite, the pH of which had been adjusted to about 3.5 by the addition of acetic acid. The results were similar to those obtained in that example.

Example XVII

Example XIV was repeated except that the phosphor was a luminescent zinc cadmium selenide phosphor containing 98 mol percent zinc selenide and 2 mol percent cadmium selenide having a dark surface discoloration due to a surface coating of copper selenide. By treatment with the treating solution of that example, the dark surface color of the phosphor was removed, revealing bright yellow orange, which is the body color of the luminescent zinc cadmium selenide phosphor without surface discoloration. The results were similar to those obtained in that example.

Example XVIII

Example XVII was repeated except that the treating solution was that described in Example XVI, the pH of which solution had been adjusted to about 3.5 by the addition of acetic acid. The results were similar to those obtained in that example.

Example XIX

Example XI was repeated except that the phosphor was a luminescent zinc sulfide phosphor having a darkened surface due to the presence on the surface of silver sulfide and lead sulfide. The phosphor, after treatment with the treating solution described in Example XI the pH of which had been adjusted to about 1 to 2 by the addition of 1 molar hydrochloric acid, had a white surface and exhibited markedly improved reflectance and emission brightness.

Example XX

Example XIX was repeated except that the treating solution was that described in Example XVII, the pH of which solution had been adjusted to about 1 to 2 by the addition of 1 molar hydrochloric acid. The results were similar to those obtained in that example.

Example XXI

Example XIX was repeated except that the treating solution was an aqueous solution of 30% sodium thiosulfate and 2% sodium metabisulfite, the pH of which solution had been adjusted to about 3.5 by the addition of acetic acid. The results were similar to those obtained in that example.

Example XXII

Example IX was repeated except that the treating solution consisted of the following:

60 grams anhydrous sodium thiosulfate plus water to make 200 milliliters
10 grams sodium bisulfate monohydrate
10 grams sodium meta-bisulfite
10 grams anhydrous sodium sulfate The pH of this solution was 2.2 and the phosphor was treated by washing for 30 minutes. The results were similar to those obtained in that example.

In exemplary procedures, Examples V–IX, XI, XII, XIV, XV, XVII, XIX and XX are repeated including up to 5% potassium ferricyanide in the respective treating solutions. As taught above, other oxidizing agents can be used.

Following the methods described in the above examples, phosphors of the type described above, activated by one or more of the metal activators referred to above such as silver, copper, gold, lead and manganese, can be improved by washing, rinsing, slurrying, effecting contact, admixing, or otherwise treating the phosphors with the described solutions, including aqueous solutions containing an acid and (1) thiourea, or (2) a salt wherein the cation is lithium, sodium, potassium, rubidium, cesium, magnesium, calcium, strontium, barium, or ammonium, and the anion is iodide, thiosulfate, or thiocyanate.

As mentioned above, the acid must have a $pK_a$ of less than 5. Illustrative of acids having a $pK_a$ above 5 which have been found to be unsatisfactory in solutions for removing the activating metal chalcogenides from luminescent phosphor surfaces are the primary phosphates, e.g., $NaH_2PO_4$, bicarbonates, e.g., $KHCO_3$, bisulfites, e.g., $NaHSO_3$, boric acid, carbonic acid, etc.

Luminescent phosphors treated according to the process of this invention may be used in the manufacture of cathode ray screens or any other use where the appearance, uniformity, reflectance and emission brightness of the phosphor are of great importance. Both black-and-white and colored television screens profit by their use. Likewise, electroluminescent phosphors of the type illustrated in several of the above examples may be utilized in electroluminescent panels of suitable structure. Such phosphors may also be used for information storage purposes as in tapes and the like. Other uses for the improved phosphors treated according to this invention include fluoroscopic screens, X-ray intensifying screens, miniature radiographic screens, etc.

An outstanding advantage of this invention is that it eliminates the use of the extremely dangerous and toxic cyanide washing conventionally used in prior art. The process of this invention also eliminates the use of expensive prior art materials and avoids the creation of waste disposal problems. A further advantage is that the phosphor treated with the salt-containing solutions according to the process of this invention may be applied to cathode ray tube screens and baked in a conventional manner without leaving any organic residue. Still other advantages will be apparent from the above description of the invention.

The invention claimed is:

1. A process for improving the physical properties of a luminescent phosphor selected from the class consisting of zinc, cadmium and zinc cadmium salts of a chalcogen having an atomic number greater than eight and activated by a metal selected from the group consisting of silver, copper, gold, lead and manganese, comprising treating said phosphor with an aqueous solution containing an acid having a $pK_a$ of less than 5 in an amount sufficient to maintain the pH of the aqueous solution between −1 and 4.5, and an appreciable amount of a water soluble compound from the group consisting of (1) thiourea, and (2) a salt the cation of which is selected from the group consisting of (a) alkali metals, (b) alkaline earth metals, and (c) ammonium, and the anion of which is selected from the group consisting of (a) iodide, (b) thiosulfate, and (c) thiocyanate.

2. The process as set forth in claim 1 wherein said solution contains up to 15% by weight of an oxidizing agent selected from the group consisting of sulfurous acid and potassium ferricyanide to remove elemental metal from the phosphor surface.

3. The process as set forth in claim 1 wherein said water soluble compound is present in said aqueous solution in a concentration within the range from 5% to 50%, based on the weight of the solution.

4. The process as set forth in claim 1 wherein said aqueous solution is admixed with said phosphor, and said phosphor is subsequently rinsed with water and dried.

5. The process as set forth in claim 4 wherein the aqueous solution and phosphor are admixed for a period of from about ½ to 3 hours.

6. The process as set forth in claim 1 wherein said salt is an alkali metal thiosulfate.

7. The process as set forth in claim 6 wherein said solution contains up to 10% by weight of a preservative to inhibit sulfurization, said preservative being selected from the group consisting of alkali metal sulfites and metal bisulfites.

8. The process of removing dark colored activating metal-chalcogenide compounds from the surface of luminescent phosphors, wherein said activating metal is from the group consisting of silver, copper, gold, lead, and manganese, and wherein said chalcogenide is from the group consisting of sulfide, selenide, telluride, sulfoselenide, and sulfotelluride, comprising washing said phosphors with an aqueous solution containing an appreciable amount of a water soluble compound from the group consisting of (1) thiourea, and (2) a salt, the cation of which is selected from the group consisting of alkali metals, alkaline earth metals, and ammonium, and the anion of which is selected from the group consisting of iodide, thiosulfate, and thiocyanate, said solution adjusted to a pH between −1 and 4.5 by the addition of an acid having a $pK_a$ of less than 5.

9. The process as set forth in claim 8 wherein said acid is acetic acid.

10. The process as set forth in claim 8 wherein said acid is sulfuric acid.

11. In a process for improving the emission brightness and related luminescent properties of a silver activated zinc sulfide cathodoluminescent phosphor, the step comprising slurrying with said phosphor an aqueous solution at room temperature, said solution containing (1) an alkali metal thiosulfate in a concentration from 5% to 50% based on the weight of the solution, and (2) sufficient acid having a $pK_a$ of less than 5 from the group consisting of acetic acid, surfuric acid, hydrochloric acid, sodium bisulfate, and phosphoric acid, to maintain the pH of said solution within the range from 3.0 to 4.0.

12. The process as set forth in claim 11 wherein said acid is acetic acid.

13. The process comprising effecting contact between a luminescent phosphor, said phosphor having a surface discoloration of a water-insoluble compound the cation of which is from the group consisting of silver, copper, gold, lead and manganese and the anion of which is from the class consisting of sulfide, selenide, telluride, sulfoselenide and sulfotelluride, and an aqueous solution at a pH from 1 to 4 and a temperature between 15° C. and 95° C. containing (1) an acid having a $pK_a$ of less than 5, (2) from 5% to 50% by weight of a water soluble compound from the group consisting of (a) thiourea, and (b) a salt the cation of which is selected from the group consisting of lithium, sodium, potassium, rubidium, cesium, magnesium, calcium, strontium, barium and ammonium, and the anion of which is selected from the group consisting of iodide, thiosulfate, and thiocyanate, and (3) less than 15% by weight of an oxidizing agent selected from the group consisting of potassium ferricyanide and sulfurous acid, said contact being effected for a time sufficient to remove said water-insoluble compound from said surface, and said acid being selected from the group consisting of acetic acid, sulfuric acid, hydrochloric acid, sodium bisulfate, and phosphoric acid.

References Cited in the file of this patent

UNITED STATES PATENTS

| | | |
|---|---|---|
| 2,252,590 | Wolfson | Aug. 12, 1941 |
| 2,541,384 | Rothschild | Feb. 13, 1951 |
| 2,546,239 | Rothschild | Mar. 27, 1951 |
| 2,743,238 | Hunt | Apr. 24, 1956 |
| 2,755,255 | Beutler | July 17, 1956 |
| 2,772,242 | Butler | Nov. 27, 1956 |
| 2,802,792 | Butler | Aug. 13, 1957 |
| 2,821,509 | Hunt | Jan. 28, 1958 |
| 2,847,386 | Mazo | Aug. 12, 1958 |